Figure 14:
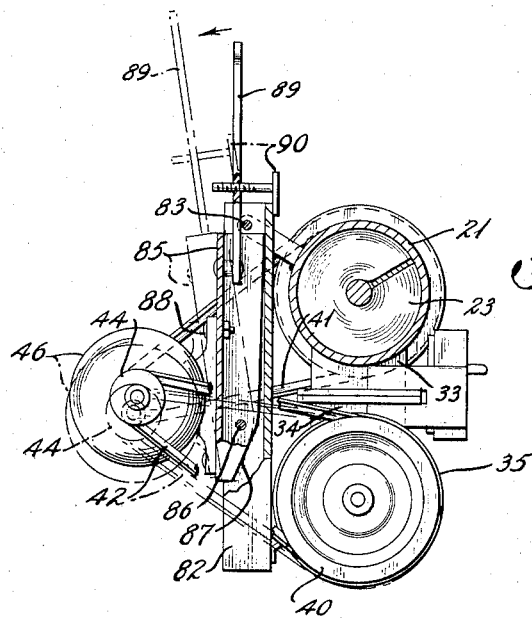

Aug. 3, 1965  W. R. LONG  3,198,313
GRAIN BIN LOADER AND UNLOADER
Filed July 26, 1962  5 Sheets-Sheet 1
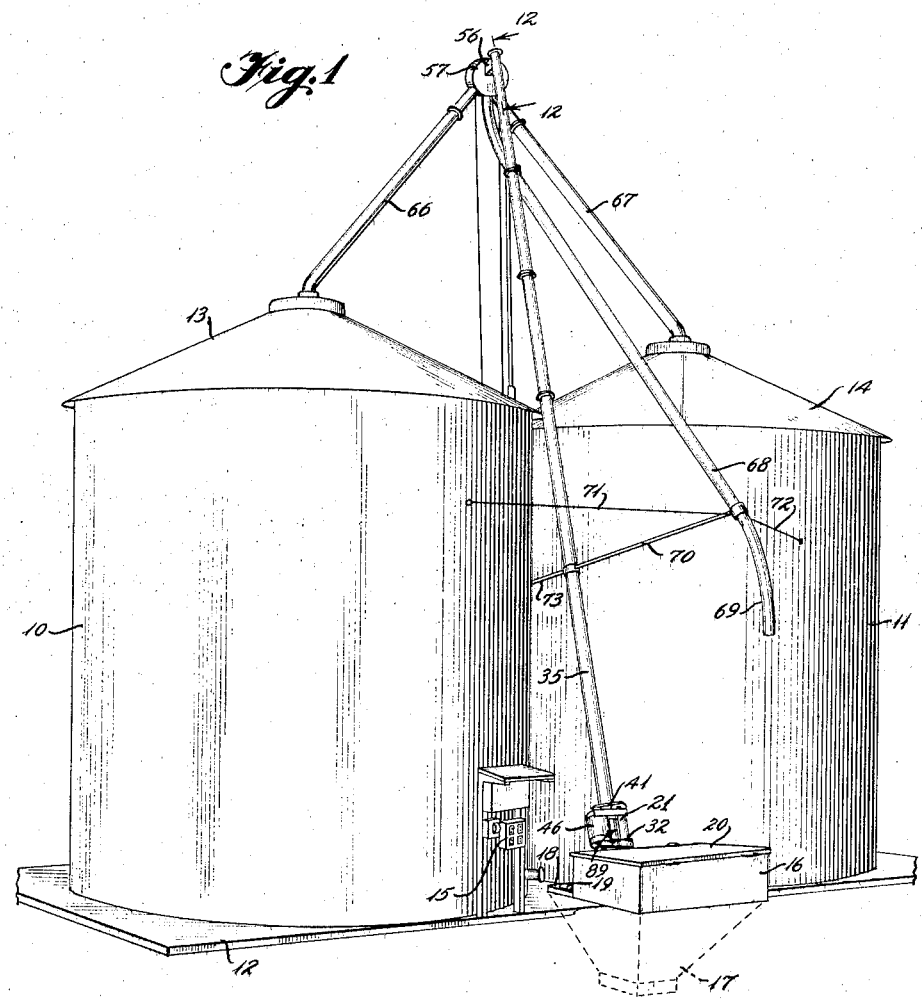
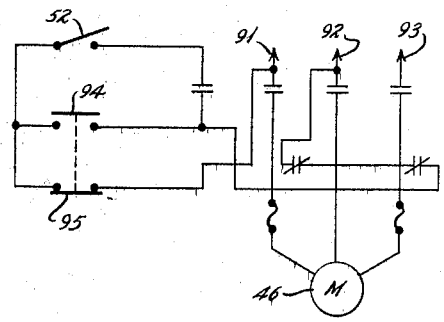
INVENTOR
*W. R. LONG*
BY
ATTORNEY

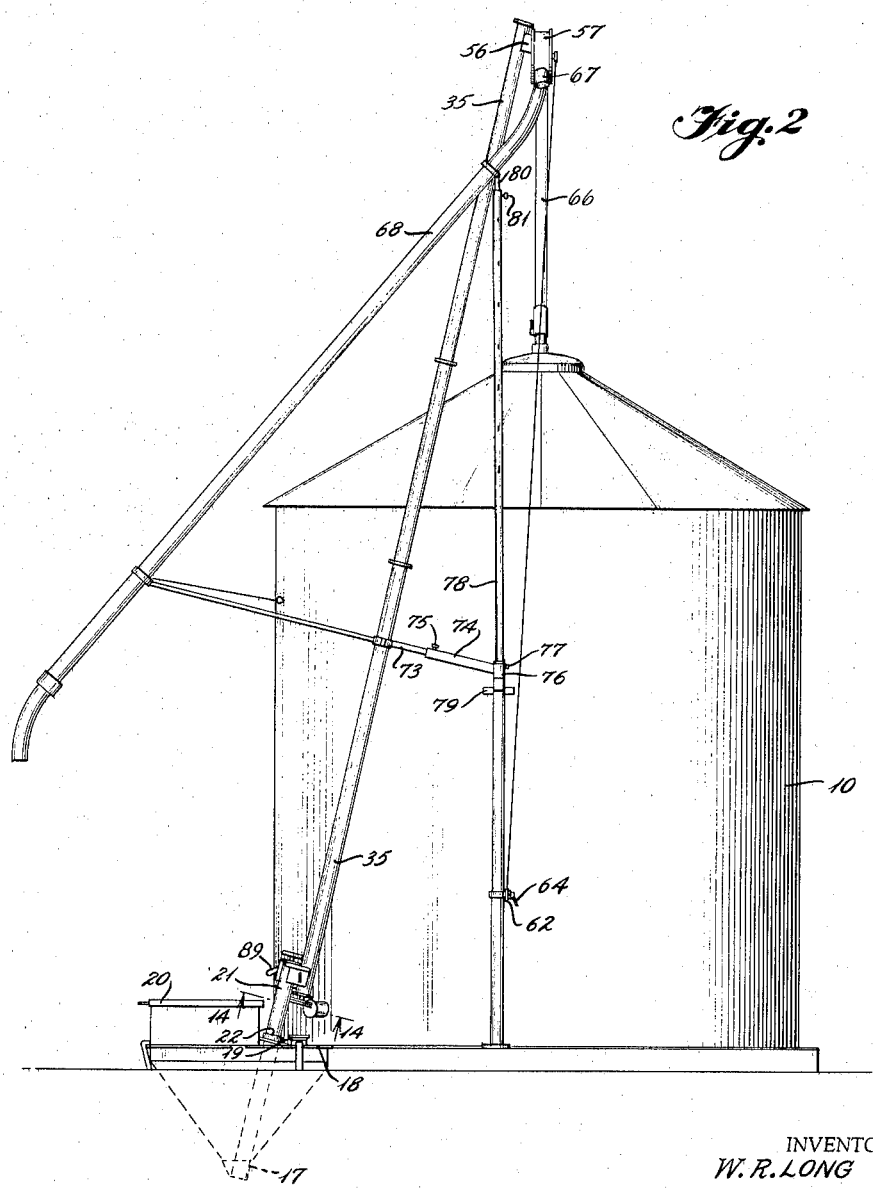

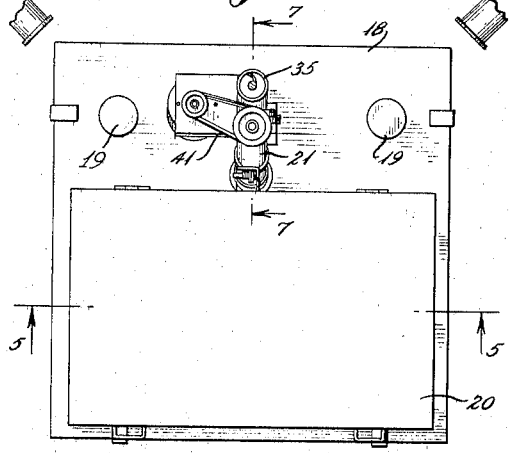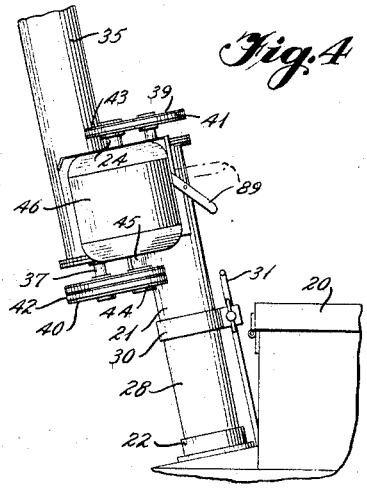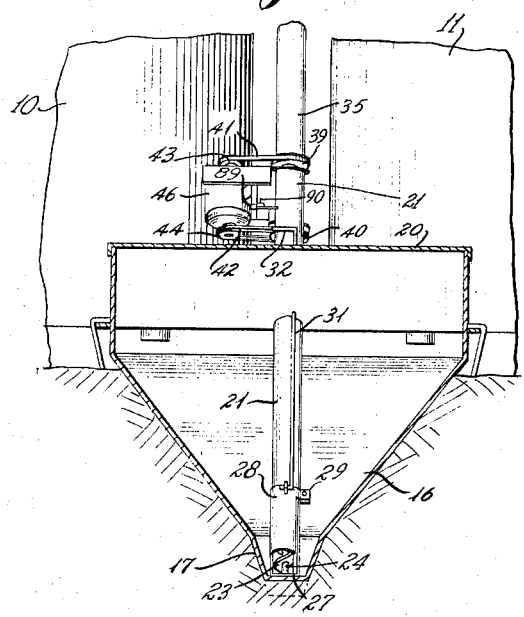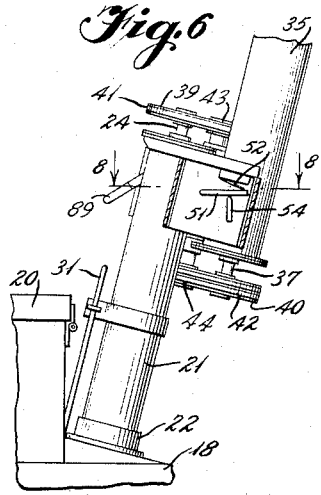

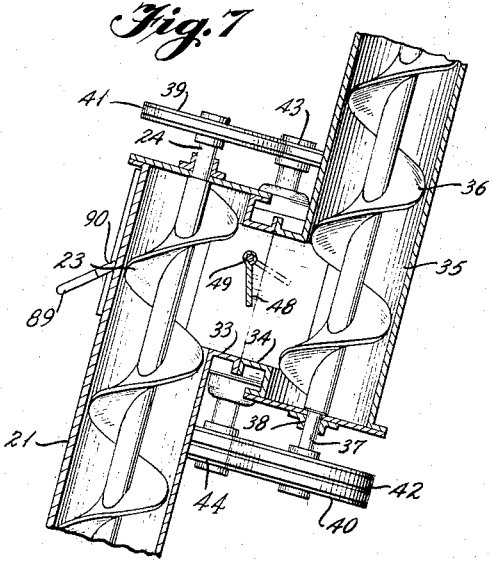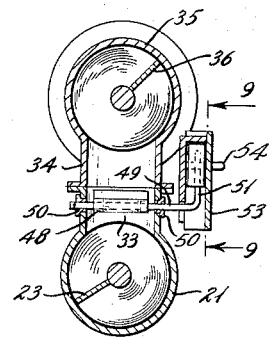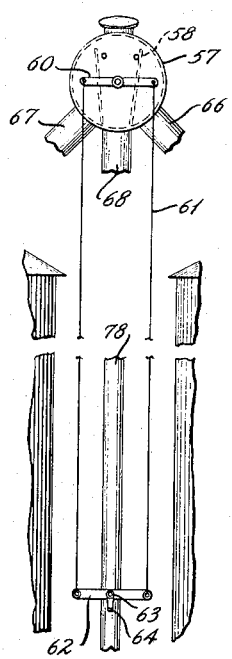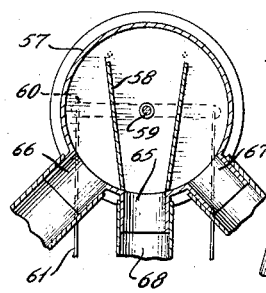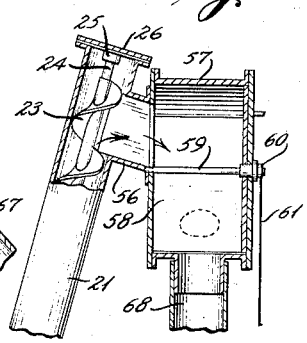

Aug. 3, 1965  W. R. LONG  3,198,313
GRAIN BIN LOADER AND UNLOADER
Filed July 26, 1962  5 Sheets-Sheet 5

INVENTOR
W. R. Long
BY
ATTORNEY

3,198,313
GRAIN BIN LOADER AND UNLOADER
William R. Long, Tarboro, N.C., assignor to Long Manufacturing Company, Tarboro, N.C.
Filed July 26, 1962, Ser. No. 212,667
4 Claims. (Cl. 198—64)

This invention relates to the harvesting of crops including grain, and to the storage loading and unloading of grain bins while maintaining the grain in the best possible condition and readily available for use wherever desired on the farm or other location.

The invention relates especially to a grain bin loader and unloader for use in connection with a pair of grain bins with a nearby loading hopper from which grain may be loaded into either of the grain bins or may be discharged into another area or container or returned to the loading hopper.

Grain storage and drying bins have been used of generally cylindrical construction but these have been filled and emptied by independent conveyors driven by independent motors during which time the presence of an attendant has been necessary and has resulted in substantial waste of time of workmen as well as in the movement of the grain.

It is an object of the invention to provide two or more grain bins and a conveniently located loading hopper preferably substantially beneath the ground and with a low sump or area to allow grain to gravitate to a concentrated low area from which an upright conveyor can elevate the grain slightly above the top of the hopper and discharge it into the lower portion of a second conveyor by which it can be carried to a position above the height of the storage bin into a housing having a valve therein and from which housing the grain can be selectively directed through three pipes one of which extends to each of the two bins and the third to an independent pipe which can be used for loading grain into a truck or other container or for directing the grain back into the loading hopper.

Another object of the invention is to provide a motor located in a readily accessible position which drives the conveyors and automatic control mechanism therefor whereby grain dumped into the loading hopper may be removed therefrom with such control mechanism operating unattended until the supply in the loading hopper is exhausted whereupon it will be caused to stop.

A further object of the invention is to provide an automatic motor cut-off in the discharge opening between the conveyors including a hinged gravity operated baffle connected to a microswitch so that as long as grain is passing from one conveyor to the other the motor will be energized but when the grain is exhausted from the lower conveyor the baffle will swing downwardly and break the connection stopping the motor.

A further object of the invention is to provide a grain bin loader and unloader including a manually controlled three-way selector valve which can be quickly operated to direct grain into either of two bins or into a truck loading discharge chute.

Other objects and advantages of the invention will be apparent from the following description taken in conjunction with the accompanying drawings wherein:

FIG. 1 is a perspective of a pair of grain bins and a nearby loading hopper and with one application of the invention thereto;

FIG. 2, a view at right angles to that of FIG. 1;

FIG. 3, a top plan view of the loading hopper;

FIG. 4, a side elevation of a portion of the loading hopper and the cooperating auger or screw type conveyors and motor for driving the augers and screws;

FIG. 5, vertical section on the line 5—5 of FIG. 3;

FIG. 6, a view similar to that of FIG. 4 from the opposite side and with the housing for the microswitch in section revealing its interior;

FIG. 7, a vertical section on the line 7—7 of FIG. 3;

FIG. 8, a horizontal section on the line 8—8 of FIG. 6;

FIG. 9, an enlarged fragmentary detail on the line 9—9 of FIG. 8;

FIG. 10, a fragmentary side elevation illustrating the operating means for the three-way valve;

FIG. 11, an enlarged vertical section through such three-way valve;

FIG. 12, a section on the line 12—12 of FIG. 1;

FIG. 13, a layout of the wiring diagram;

FIG. 14, an enlarged section on the line 14—14 of FIG. 2; and

Figure 15:
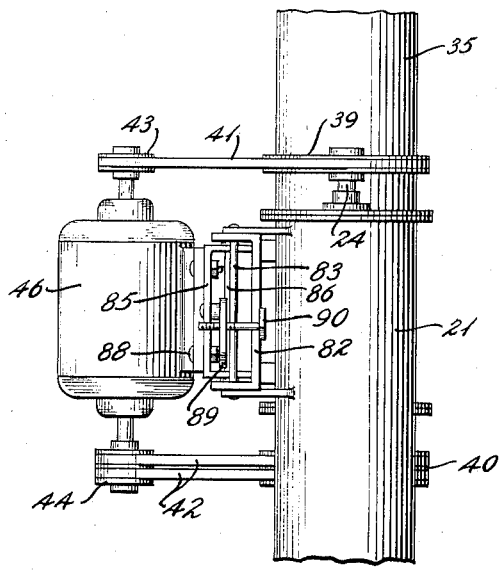

FIG. 15, a side elevational view of the motor mounting and operating means for disengaging the drive.

Briefly stated, the grain bin loader and unloader of the present invention is of a construction to be used in connection with a pair of bins with a loading hopper as an adjunct thereto, the hopper preferably having all but its upper portion embedded in the earth and with a two section upright pipe containing a conveyor or auger and having a discharge in the vicinity of its upper end, a motor being located in the area of the connection between the two sections and serving to drive both sections of the conveyor or auger, the motor being mounted on a pivoted platform controlled by a hand lever to allow the second or upper auger to be connected to the motor after the lower auger is running to require less starting strain or torque on the motor.

An automatic motor cut-off is located in the opening between the two sections of the conveyors and includes a pivoted gravity operated baffle which energizes a microswitch as long as grain is passing through from one auger to another, but when the grain is exhausted the baffle will move downwardly by gravity to break the connection and stop the operation of the motor.

At the upper end of the uppermost conveyor is located a three-way selector valve mounted on a central hinge or pivot and with a bar affixed thereto and a depending cable or chain from each end of the bar by which the position of the valve may be manually changed to direct the flow of grain through a pipe to each of the bins or through a third pipe by which a truck may be loaded. With the construction thus disclosed the hopper is adapted to receive grain or other material from either of the bins for loading a truck or from a truck for loading the bins. The hopper has downwardly inclined walls defining a sump for complete unloading. For ease of filling the hopper preferably has its upper portion near the ground level and motor slightly above the hopper with mercury controlled switch to stop when the hopper is emptied.

With continued reference to the drawings, in the present invention two or more grain bins 10 and 11 are mounted upon flooring 12 and are provided with roofs or closures 13 and 14 and a control panel 15.

Near the bins 10 and 11 is provided a loading hopper 16 having an inclined side wall defining a relatively small bottom or sump 17 to make it possible to remove the entire contents of the hopper. The hopper also is provided with a shelf or offset 18 and one or more vents 19 and a hinged cover 20 which upon being removed will permit the dumping of grain into the hopper from a truck or other source until the hopper is filled.

In order to remove grain from the hopper, an upright pipe 21 is provided which extends through the shelf 18 of the hopper and is provided with a sealing gasket 22 to exclude moisture.

Within the pipe 21 is an auger or screw conveyor 23 including a shaft 24 journaled in a bearing 25 and a cap 26 at the upper end of the pipe 21. The lower end of the pipe 21 has a lateral flange 27 in which the lower end of the shaft 24 is journaled. About the lower end of the shaft is mounted a sleeve 28 which forms in effect a valve, such sleeve being attached by clamps 29 and 30 to a valve operating rod 31 which extends upwardly along the pipe 21 and has its upper end provided with an operating portion or handle 32 located conveniently above the hopper and by means of which the amount of grain admitted to the auger or screw conveyor 23 is determined.

The upright pipe 21 is provided with a discharge 33 which connects to an inlet 34 of a second upright or elevated pipe 35 in which also is contained an auger or screw conveyor 36 mounted on a shaft 37 journaled in and extending through a bearing 38 at the lower end thereof. Grain elevated by the conveyor 23 will be discharged through the connections 33 and 34 into the upright pipe 35 and be carried upwardly by the auger or screw conveyor 36 when both screw conveyors are operating.

Driving means may be provided for the screw conveyors including a pulley 39 on the shaft 24 and single or multiple pulleys 40 on the shaft 37 which pulleys are adapted to be driven by belts 41 and 42 from pulleys 43 and 44 on opposite ends of a shaft 45 of a motor 46, such motor being mounted in a manner which will be described later.

In order to overcome the necessity of having an attendant present to stop the operation of the motor 46, automatic means may be provided in the form of an automatic cut-off which includes a baffle 48 mounted on a hinge or pivot 49 and which will be kept in an elevated substantially horizontal position as illustrated in dotted lines in FIG. 7 during the passage of grain from the lower to the upper conveyors and with such baffle moving to a depending position by gravity when the flow of grain terminates.

The hinge or pivot 49 is journaled in bearings 50 in the discharge 33 and such pivot 49 has an operating arm 51 which engages one arm of a microswitch 52 which closes completing the circuit to the motor 46, such switch being contained in a switch housing 53 and a manual operating element 54 being provided for maintaining the switch in closed position.

It will be apparent therefore that grain may be dumped into the hopper 16 from a truck cart or other source and the switch manually operated to cause the motor to drive the conveyors 33 and 36 and this will cause the conveyance of the grain from the hopper upwardly through the pipe 35. Grain carried upwardly in the pipe 35 will be caused to pass through a discharge 56 into a valve housing 57 (FIGS. 1, 2 and 12).

Within the valve housing is located the three-way selector valve 58 (FIG. 11) fixed to a pivot 59 to which also is fixed a bar 60 and to each end of which is attached a depending cable or chain 61 which connects to a similar operating bar 62 mounted on a pivot 63 and with a manipulating arm 64 by which the bar 62 may be rocked and the position of the valve 58 changed.

The valve housing or casing 57 is provided with a depending opening 65 and a pair of side openings 66 and 67, the opening 65 being in communication with a discharge pipe 68 through which grain may be discharged from the hopper 16 or from either of the grain bins, such discharge pipe having a curved dispensing extremity 69 supported by brackets 70, 71 and 72, extending respectively to the pipe 35 and the bins 10 and 11.

If desired, the bracket 70 may have an extension 73 telescopically connected to a second bracket 74 and fixed thereto by means of a set screw 75, the bracket 74 having a sleeve 76 and a set screw 77 by which it may be attached to an upright support 78 on which the bar 62 and manipulating arm 64 may be mounted. Such bracket also may be secured by the another bracket 79 to the bin 10 and with its upper end having a connection 80 with the pipe 35 and adapted to be secured in fixed adjusted position relative thereto by means of a set screw 81.

In order to reduce the starting torque on the motor 46 it is desirable to first start the lower auger 23 and then start the upper auger 36. This is accomplished by providing a generally U-shaped platform 82 (FIGS. 14 and 15) pivotally mounted by pins 83 on lugs 84 carried by the upper end of the pipe 21. An inverted U-shaped motor mount 85 is pivotally mounted within the U-shaped platform 82 by a pivot pin 86 and such motor mount is provided with a tapered portion 87. The motor 46 is connected to the motor mount 85 in any conventional manner as by bolts 88. An operating lever 89 is pivotally attached to the motor mount 85 on the side opposite the tapered portion and such lever threadedly receives an adjusting and locking bolt 90 located exteriorly of the platform 82. During the normal operation of the device the motor 46 is adapted to drive both augers simultaneously and during this operation the lever 89 is pivoted downwardly to the position shown in full lines in FIGS. 4 and 15 so that the head of the adjusting bolt 90 is located below the platform 82 and in engagement therewith to maintain the motor in position. At the beginning of the operation the lever 89 is pivoted upwardly to the position shown in phantom in FIGS. 4 and 15 in which position of the head the adjusting bolt 90 is no longer beneath the platform 82 and the motor mount 85 may be manually pivoted about the pin 86. This movement retains the tension on the belts 41 and moves the pulley 44 closer to the pulley 40 and thereby relieves the tension on the belt 42 so that such pulley will not be rotated. When the motor has been started the lower auger 23 will begin operation at once and after such auger has been started the motor mount is swung to the position illustrated in FIGS. 14 and 15 and the operating lever 89 is pivoted downwardly to engage the head of the adjusting bolt 90 under the platform 82. Moving of the motor outwardly applies tension to the belt 42 and starts operation of the auger 36 within the upper pipe 35.

In FIG. 13 there is illustrated an electrical schematic showing the hook up for a 3-phase motor. Electrical current is supplied to the motor through lines 91, 92 and 93 and the manual starting and stopping of the motor is controlled by push button switches 94 and 95 respectively.

It will be apparent from the foregoing that a grain bin loader and unloader is provided in which the power unit is located in a readily accessible position above the earth although it drives an elevating conveyor which extends beneath the earth's surface and a second elevating conveyor which extends to an elevation substantially above a grain bin, that the use of only one power unit located at an intermediate position remote from contact with the grain is a distinct advantage, as also is the automatic control which permits the unit to be set in operation and left unattended so that an attendant may proceed about his work and not have to wait until the complete removal of grain into the hopper or from the bins is accomplished. Further the device is substantially foolproof notwithstanding the fact that it is relatively simple and inexpensive to manufacture.

It will be obvious to one skilled in the art that various changes may be made in the invention without departing from the spirit and scope thereof and therefore the invention is not limited by that which is illustrated in the drawings and described in the specification but only as indicated in the accompanying claims.

What is claimed is:

1. Grain bin loading and unloading mechanism comprising a loading hopper adapted to be embedded in the earth near the grain bins to be loaded and unloaded, said hopper having inclined wall structure defining a sump into which grain can flow by gravity, an auger-type conveyor in said hopper for elevating grain from said sump to the top of the hopper, a second auger-type conveyor overlapping and in communication with the first and having its upper end at an elevation above the grain bin, a motor located at the joint between the conveyors and having a motor shaft, means for driving said conveyors directly from opposite ends of said motor shaft, means whereby the drive may be imparted to the first conveyor ahead of the second, a movable control member actuatable by the movement of the grain controlling the operation of the motor and constructed to stop the motor when the flow of grain is exhausted, a valve housing connected to the second conveyor at its end remote from the first conveyor, said valve housing having a series of discharge openings, a series of pipes leading from said discharge openings including to a grain bin, and a selector valve in said valve housing for determining the path of flow of the grain.

2. Grain bin loading and unloading mechanism comprising a loading hopper, overlapping conveyor means for moving grain from said hopper selectively to multiple discharge areas including a grain bin, multiple cooperative conveyors overlapping and in spaced communication for moving grain from said hopper, one of said conveyors serving to elevate grain from the bottom to an elevation above the top of the hopper and the other to move the grain from the first conveyor, a motor pivotally mounted between the overlapping portions, means to connect said motor to said conveyors to drive the latter directly from opposite ends of said motor, and means manually to pivot the motor whereby in a first position the first conveyor alone is operated and in a second position both conveyors are operated.

3. Grain bin loading and unloading mechanism comprising a hopper, first and second auger-type conveyors overlapping and in communication with each other for elevating grain from said hopper, means forming a passageway between said conveyors, a motor at a conveniently accessible location above said hopper and intermediate and adjacent the overlapped ends of said conveyors connected to drive same, a valve housing connected to the upper end of said conveyor and having a series of discharge openings, a valve in said housing for the selective direction of grain through said openings, means for operating said valve being located remote from said valve housing and pipe leading from said openings including to a grain bin for conveying grain thereto and to an additional place of discharge, and control means within the passageway for automatically stopping the operation of the conveyors after the grain is exhausted from the hopper and the first conveyor, said control means being provided with latching means so that operation of said conveyor may be continued even though the grain is exhausted from said hopper, said latching means having a lock so that control means can be locked in operating position.

4. Grain bin loading and unloading mechanism as set forth in claim 2 having a movable control member actuatable by the movement of grain controlling the operation of the motor and of a character to stop the motor when the flow of grain is exhausted, said control member being further provided with latching means whereby said conveyors may continue to operate even though grain is absent from said first conveyor by locking latching means in operating position.

References Cited by the Examiner
UNITED STATES PATENTS

| | | | |
|---|---|---|---|
| 1,433,754 | 10/22 | Stone | 214—16 X |
| 1,750,552 | 3/30 | Umbreit | 214—16 |
| 1,953,032 | 3/34 | Turner | 198—15 |
| 2,249,372 | 7/41 | Askenback | 198—64 X |
| 2,364,166 | 12/44 | Scholl | 198—82 |
| 2,452,395 | 10/48 | Schelling | 198—37 |
| 2,569,811 | 10/51 | Hanna | 198—15 |
| 2,589,220 | 3/52 | Buckeridge | 198—82 |
| 2,615,587 | 10/52 | Beyer et al. | 198—64 X |
| 2,737,834 | 3/56 | Coughlin et al. | 198—37 X |
| 2,988,203 | 6/61 | Peterson | 198—213 |

HUGO O. SCHULZ, *Primary Examiner.*
GERALD M. FORLENZA, *Examiner.*